(No Model.) 2 Sheets—Sheet 1.

E. E. WHIPPLE.
SUPPORTING ATTACHMENT FOR HARROWS.

No. 600,661. Patented Mar. 15, 1898.

Witnesses
Geo. E. Fuch
J. M. Nesbit

Inventor
E. E. Whipple
per Hubert Peck
Attorney

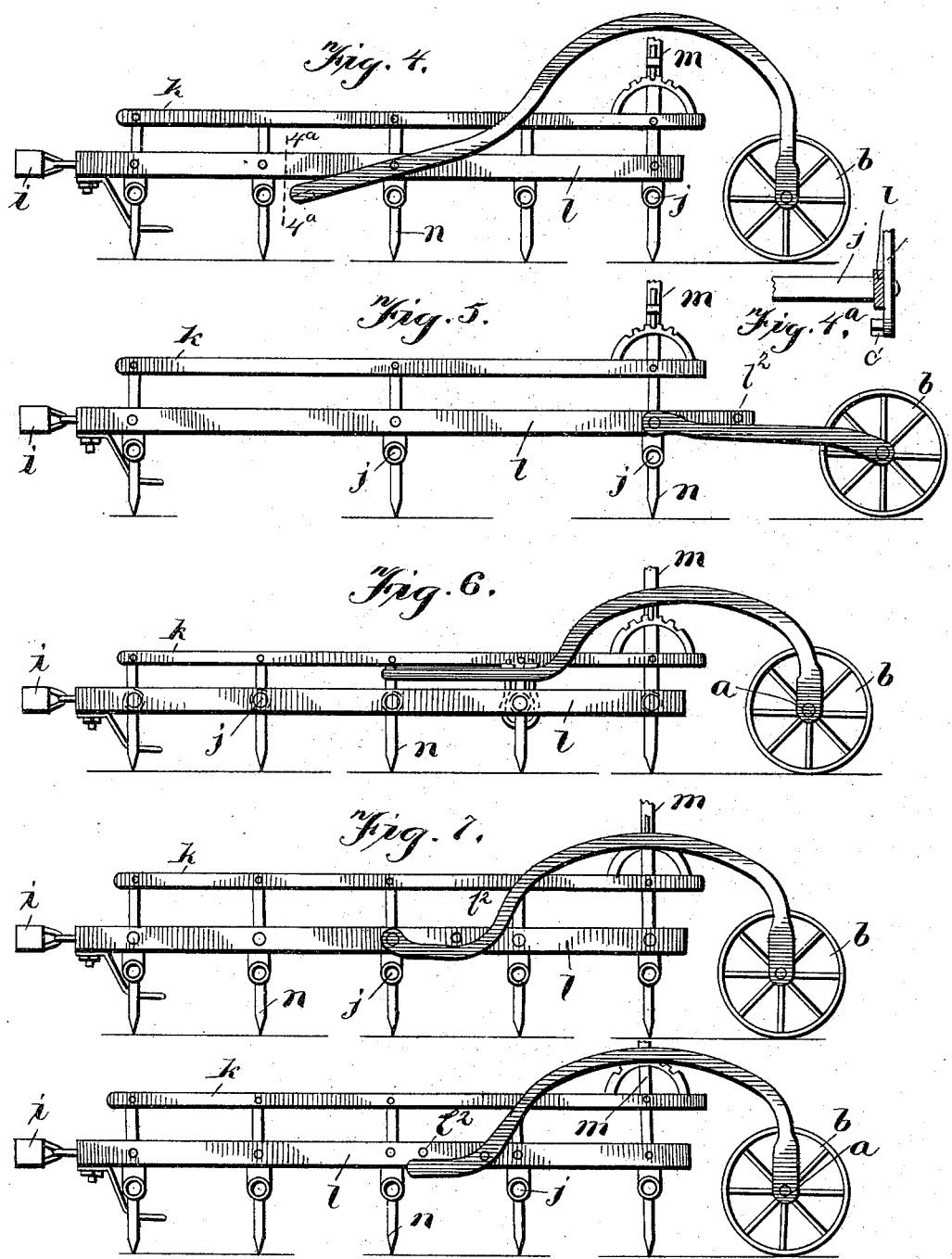

UNITED STATES PATENT OFFICE.

EFFINGER E. WHIPPLE, OF COOPERSTOWN, NEW YORK.

SUPPORTING ATTACHMENT FOR HARROWS.

SPECIFICATION forming part of Letters Patent No. 600,661, dated March 15, 1898.

Application filed March 3, 1897. Serial No. 625,870. (No model.)

*To all whom it may concern:*

Be it known that I, EFFINGER E. WHIPPLE, a citizen of the United States, residing at Cooperstown, in the county of Otsego and State of New York, have invented certain new and useful Improvements in Supporting Attachments for Harrows; and I do hereby declare the following to be a full, clear, and exact description of the invention, such as will enable others skilled in the art to which it appertains to make and use the same.

This invention relates to certain improvements in wheeled supporting attachments for harrows.

Among other features of novelty hereinafter pointed out and described I claim to be the first to have invented a wheeled riding attachment, in combination with a lever-harrow, whereby the teeth are operated by the lever connected to the harrow-frame and the depth of the teeth gaged by the support, and by and in said combination the harrow-sections are practically independent of the wheeled riding attachment, allowing the harrow-sections free and independent movement the same as the ordinary float-harrow, except that the harrow-sections, when the teeth have entered the ground a certain depth, settle down and rest upon the supports of the wheel and riding attachment, controlling the depth of cut instead of the depth being governed by the frame dragging upon the ground, thereby avoiding by carrying the weight of the harrow-frame and the driver free and clear from the earth on the riding or wheel attachment the great friction that exists in a harrow-frame dragging on the ground, or in those that have wheel and riding attachments attached rigidly to the harrow-frame throwing the weight of the attachment and driver upon the teeth and harrow-frame, restricting the free and independent movement of the harrow, which my device allows when in operative engagement with the soil and which carries the frame in a given horizontal plane elevated above the ground when the teeth are in or out of operative engagement with the soil. I also claim in this independent combination the only wheeled riding attachment whereby in operating the levers two functions are performed, that of gaging the depth of cut, suction, and pitch of the teeth and that which by throwing the levers forward raises the teeth clear from the earth by supporting and carrying the frame in a given horizontal plane, and by so doing the harrow-sections are carried upon the supports of the independent riding or wheel attachment, and the only attachment whereby the operator can sit upon the seat and operate the levers of what is known as a "lever-harrow," where the teeth are operated by the lever setting the teeth to run at a certain depth to throw the teeth forward for transporting, and where the operator can sit on the seat and lift either section up at the rear end the same as though it were a common float-harrow with the operator walking behind.

An object of the invention is to provide an improved, simple, durable, and effective supporting attachment which can be easily attached to various styles of lever-adjustment harrows or other like cultivating implements, which, when the teeth of the implement are lowered and in operative position, can move vertically and follow the surface of the ground independently of the attachment and without carrying the weight of the attachment or correspondingly moving the same, and yet so arranged that the movement of the harrow-levers which raise the teeth will throw the weight of the rear end of the harrow onto the support, so that the weight of the harrow can be thrown onto or from the support by the movement of the harrow-levers which control the teeth and without providing separate levers and connections for this purpose.

Referring to the accompanying drawings, Figure 1 is a plan view of a two-section harrow, showing an attachment built in accordance with the present invention coupled thereto and provided with a riding attachment. Fig. 2 is a side elevation without the riding attachment, one frame-bar being partially broken away. Fig. 3 is a side elevation of the attachment in detail, a harrow or other implement not being shown. Fig. 4 is a side elevation of a modification wherein the sustaining-bar is deflected upwardly between its ends and is pivotally joined to a frame-bar with its end extended forwardly, with a lateral projection beneath and arranged to engage the frame-bar when the teeth are raised. Fig. 4$^a$ is a cross-sectional view on the line 4$^a$ 4ᵃ, Fig. 4. Figs. 5, 6, 7, and 8 are side elevations showing various forms and arrangements of supports constructed in accordance with this invention.

In the drawings, $a$ is the main frame or support of the attachment, here shown specifically as a bar or axle which can, if so desired, be formed of a straight section of gas-pipe of the desired length. This frame is provided with the supporting-wheels $b$, arranged at or near the ends thereof.

$c$ are sustaining-bars extending forwardly from the axle or supporting-frame. In the construction shown in the drawings, adapted for a two-section harrow, four of these sustaining-bars are shown, two arranged at the ends of the axle and the remaining two arranged at an intermediate or central portion of the axle, so that the bars are secured to the axle at or near their rear ends and on opposite sides of each wheel. Each sustaining-bar, at an intermediate point in its length, is provided with a depending U-shaped clip $d$ or any other suitable device or connection which will permit loose connection of the sustaining-bar with a part of a harrow or like implement, so that the sustaining-bar can rock vertically from such intermediate point with its front end extending forwardly beyond the same and its rear end extending rearwardly to and supported by the axle.

If so desired, the sustaining-bars can be secured to the axle in vertical adjustment. For instance, I show split rings or spring-clips $o$, secured at the ends of the axle in any suitable manner, as by having shanks inserted and bolted in the ends of the pipe, if such be employed to form the axle. The two end sustaining-bars have lateral extensions at their rear ends, secured in said end clips by the bolts of the clips contracting the same around the lateral vertical portions of the sustaining-bars. By this arrangement the end sustaining-bars can be adjusted vertically by loosening the clips and moving the vertical portions of the bars up or down therein. However, I do not limit my invention to the employment of such adjusting means, or, in fact, to the employment of any adjusting means or to the employment of adjusting means at the rear ends of the sustaining-bars, as said bars can be arranged at their front ends for vertical adjustment.

This supporting attachment can be employed with or without a riding attachment, as desired by the user. The riding attachment preferred comprises a draft-tongue $e$, extending forwardly and provided with a suitable seat $f$ at its rear end and secured to and supported a suitable distance above the axle or frame of the support by the braces $g$ $g$, preferably secured to the tongue beneath the seat and extending downwardly and forwardly and spread and at their lower ends detachably bolted or otherwise secured to the axle in any suitable manner. The front end of the tongue is provided with an eye or other suitable arrangement to permit easy and detachable coupling with the front portion of a harrow or other implement, such as to the draft attachments thereof. The tongue is here shown as a straight bar extending from the seat to the coupling-point at the front end. It can be easily removed or attached when desired by reason of the detachable coupling at its front end and the detachable braces at its rear end.

The device thus described is particularly adapted and intended for independent manufacture and sale for attachment to harrows already on the market or in use and for which it is adapted. The device can be readily attached to various constructions of lever-adjustment harrows or cultivating implements of certain construction.

As an illustration and for the sake of clearness in describing the invention I have shown in the drawings a form of harrow with the support applied thereto, although, of course, the invention pertains to no particular form of harrow.

As an example I have shown that character of spike-tooth harrow wherein the rocking tooth-bars $j$, carrying spike-teeth $n$, pass directly into or through the frame-bars $l$ and are mounted to turn therein when actuated by the hand-levers $m$ and adjusting-bars $k$, the teeth being locked in the desired position, as usual, by the pawl-and-ratchet mechanisms connected with the hand-levers and adjusting-bars. The hand-levers extend up from the rear ends of the harrow-sections, a two-section harrow being shown, so that when the levers are thrown forward the teeth are raised from the ground, and the opposite movement throws the teeth down to operative cultivating position.

The harrow is shown provided with an evener-bar $i$, arranged in front of both sections and loosely coupled thereto, and to which the draft is attached.

In applying the support to the harrow the axle is arranged a suitable distance in rear of both sections thereof, and the tongue of the riding attachment extends over and a distance above the center of the harrow and at its front end at $h$ is loosely coupled to the evener-bar by a single bolt. The sustaining-bars are arranged over the harrow, usually over the last two tooth-bars at the rear, and at or about their centers are loosely coupled to the rear tooth-bars, so as to permit turning of the tooth-bars or rocking of the sustaining-bars independently, while the front ends of the sustaining-bars are arranged over a part of the harrow in advance of the rear tooth-bar, usually over the second tooth-bar toward the front.

When the teeth are in operative position, the harrow is free to move vertically independently of the rear axle and wheels and without carrying the weight thereof.

When it is desired to transport the harrow or move it without cultivating the ground, the rider from the seat *f* can reach forward and throw the adjusting-levers to raise the teeth, and as the teeth move up the frame settles down and is held the proper distance from the ground at the front by suitable shoes or other supports, while at the rear as the frame moves down the front ends of the sustaining-bars settle down on the upper edges of the tooth-bars in front of the rear bar, and thus the sustaining-bars carry the rear end of the harrow from the rear wheeled support. The rider can also from his seat draw back the harrow-levers and thus throw down the teeth to operative position and thus relieve the supporting attachment of the weight of the rear of the harrow and permitting the harrow to travel over the surface of the ground as desired.

If desired, the two intermediate sustaining-bars which carry the weight of the inner sides of the harrow-sections need not be rigidly attached at their rear ends to the axle, but have their rear ends detached from and merely arranged to rest and bear down on the axle when the support is carrying the harrow; also, where the supporting attachment is to be employed with that character of harrows having their frame-bars arranged a distance above the tooth-bars and provided with depending bearings for the tooth-bars, the sustaining-bars can be pivoted to the frame-bars or other part of the frame and extend beneath a rigid lateral stop from a part of the frame, so that when the teeth are raised the frame will settle down and said stops will rest on the sustaining-bars—for instance, as shown in Figs. 5, 7, and 8. These stops can be arranged in any suitable manner on the frame or the sustaining-bars or in advance of or behind the pivotal points of the sustaining-bars; also, the sustaining-bars can be deflected upwardly between their ends to avoid the frame and parts of the harrow and also to prevent collection of trash.

Fig. 4 shows a sustaining-bar pivoted a short distance in rear of its front end to the outer face of the side frame-bar at or about the center of the length of the harrow, with the rear portion of the sustaining-bar deflected upwardly. The sustaining-bar in advance of its pivot is arranged between the tooth-bars, so that its free downward swing is unobstructed, and said forward free end of the bar is provided with a lateral stop $c'$ (shown clearly in Fig. 4$^a$) beneath the frame-bar to coact therewith, as before described. Fig. 8 shows approximately the same construction, the frame-bar having the lateral stop $l^2$, while the sustaining-bar is pivoted in rear of the center of the harrow.

Fig. 7 shows the sustaining-bar pivoted at its front end over a tooth-bar and from thence extending rearwardly beneath a stop $l^2$ from the frame-bar. Fig. 6 shows approximately the same construction as shown in Fig. 2, with the exception that the sustaining-bar is deflected upwardly between its ends.

Fig. 5 shows a harrow wherein the tooth-bars do not project beyond the sides of the frame-bars, and a straight sustaining-bar is shown at the outer side of and clearing the frame-bar and pivoted thereto at any point, with the stop $l^2$ at or near the rear end of or in rear of the center of the harrow, so that the sustaining-bar is not deflected up to clear the harrow or parts thereof.

Figure 1:
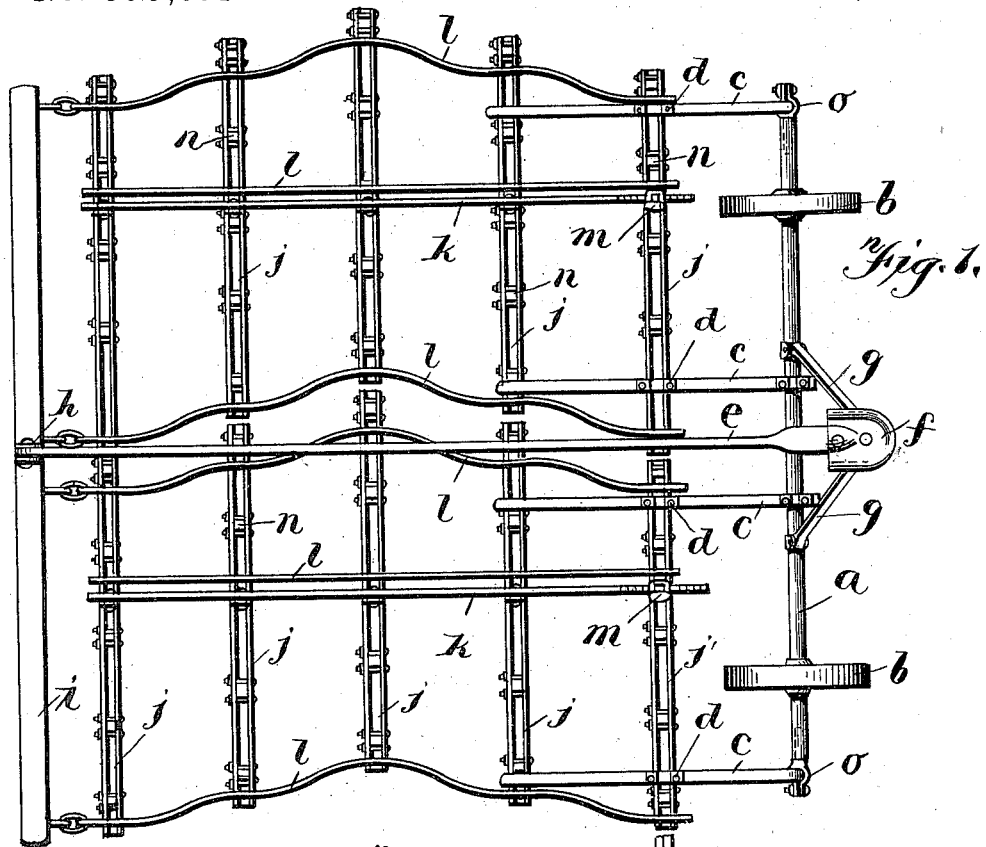
Figure 2:
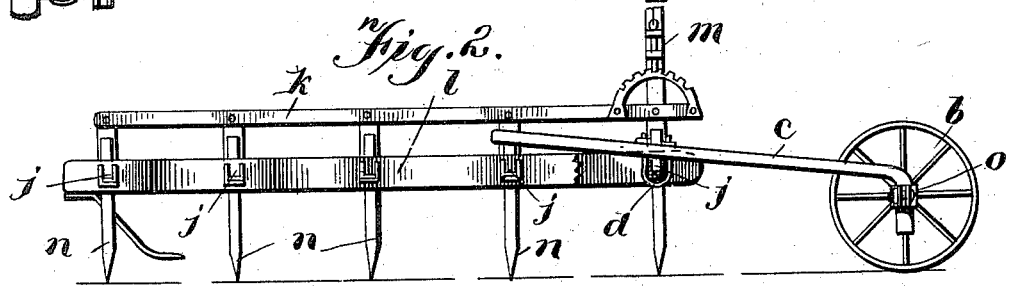
Figure 3:
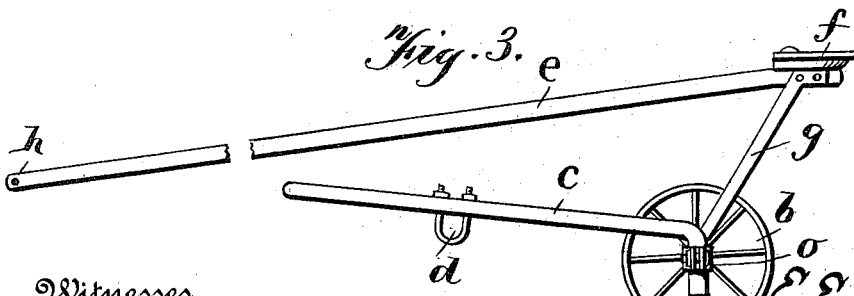

It is evident that various changes might be made in the forms, constructions, and arrangements of the parts described without departing from the spirit and scope of my invention. Hence I do not wish to limit myself to the particular constructions herein set forth.

Having thus fully described my invention, what I claim as new, and desire to secure by Letters Patent of the United States, is—

1. A wheeled supporting attachment for harrows comprising a wheeled axle having supports fixedly secured thereto, and the straight forwardly and downwardly extending draft-tongue adapted at its front end for loose coupling at the front of the harrow and provided with a seat and supporting-braces extending therefrom down to and rigid with the axle, substantially as described.

2. A wheeled attachment for harrows comprising a wheeled axle having clamps, forwardly-extending supports, having vertical portions at their rear ends secured in vertical adjustment in said clamps, substantially as described.

3. A wheeled supporting attachment for harrows comprising a wheeled axle having forwardly-extending supports loosely coupled between their ends to the after part of the harrow with their front ends arranged above and adapted to settle down on the harrow and thereby carry the rear end of the harrow from the axle, in combination with a rocking tooth-bar harrow, substantially as described.

4. A wheeled attachment, in combination with a lever-adjustment harrow, said attachment provided with supports extending forwardly and pivoted or coupled to the harrow, with a part of each support to one side of its rocking-point opposite a rigid part of the harrow so that the harrow is free to move over the ground when the teeth are in operative position independently of the support, and so that when the harrow reaches a given elevated plane said supports and rigid parts will come together and the harrow will be carried in an elevated plane, substantially as described.

5. A wheeled attachment, in combination with a lever-adjustment harrow having depending supports, said attachment having forwardly-extending supports arranged above the plane of the harrow-frame and pivotally joined to the harrow and each arranged to engage a part of the harrow when the same reaches a given elevated plane whether the teeth are in or out of the soil so that the supports will carry the harrow on the wheeled attachment, substantially as described.

6. A wheeled attachment comprising a wheeled axle having forwardly-extending supports extending along the outer sides of the harrow-frame and pivoted thereto, stops to sustain the harrow in an elevated plane whether the teeth are in or out of the soil, in combination with a lever-harrow, substantially as described.

7. A wheeled attachment for harrows, in combination with a harrow, said attachment arranged in rear of the harrow and having supporting-bars extending forwardly and loosely joined to the harrow so that the harrow can rock at the joints with the bars, whereby when the harrow-frame settles down to a given elevated plane the bars will, at points to one side of their joints with the harrow, engage rigid or other parts of the harrow-frame and thus uphold the same when the teeth are in or out of the soil, substantially as described.

8. A wheeled attachment for harrows, in combination with a harrow, such attachment having horizontally-disposed sustaining-bars extending above the plane of the harrow and loosely coupled to the harrow and abutting to one side of their pivotal points, against rigid parts of the harrow to limit the downward movement of the harrow-frame below a certain elevated plane, said sustaining-bars deflected upwardly; whereby the harrow-frame can move above said plane without lifting the wheeled attachment, substantially as described.

9. A wheeled attachment, and a lever-harrow, in combination with connected pivoted supporting mechanism, substantially as set forth, for supporting the frame in a given horizontal plane above the ground and to leave the frame free to move above the horizontal plane of the support without raising the wheeled attachment.

10. A wheeled attachment, a lever-harrow, in combination with connected pivoted supporting mechanism, substantially as set forth, and stops, for supporting the frame in a given horizontal plane above the ground.

11. A two or more section lever-harrow, in combination with a wheeled attachment connected with the draft thereof, and having pivoted connecting supporting-bars arranged respectively, at opposite sides of each section, to hold or support the same in a given elevated plane above the ground and against side wabbling or tilting and whether or not the teeth are in or out of the soil, whereby the sections can be independently moved above such plane without lifting the wheeled attachment.

In testimony whereof I affix my signature in presence of two witnesses.

EFFINGER E. WHIPPLE.

Witnesses:
FENNIMORE WHIPPLE,
HANNAH M. WHIPPLE.